Dec. 14, 1926.

M. L. SHEETZ 1,610,722

TIRE CARRIER

Filed Feb. 2, 1926

Inventor
Martin L. Sheetz
By his Attorneys
Redding, Greeley, O'Shea & Campbell

Dec. 14, 1926.
M. L. SHEETZ
1,610,722
TIRE CARRIER
Filed Feb. 2, 1926   2 Sheets-Sheet 2
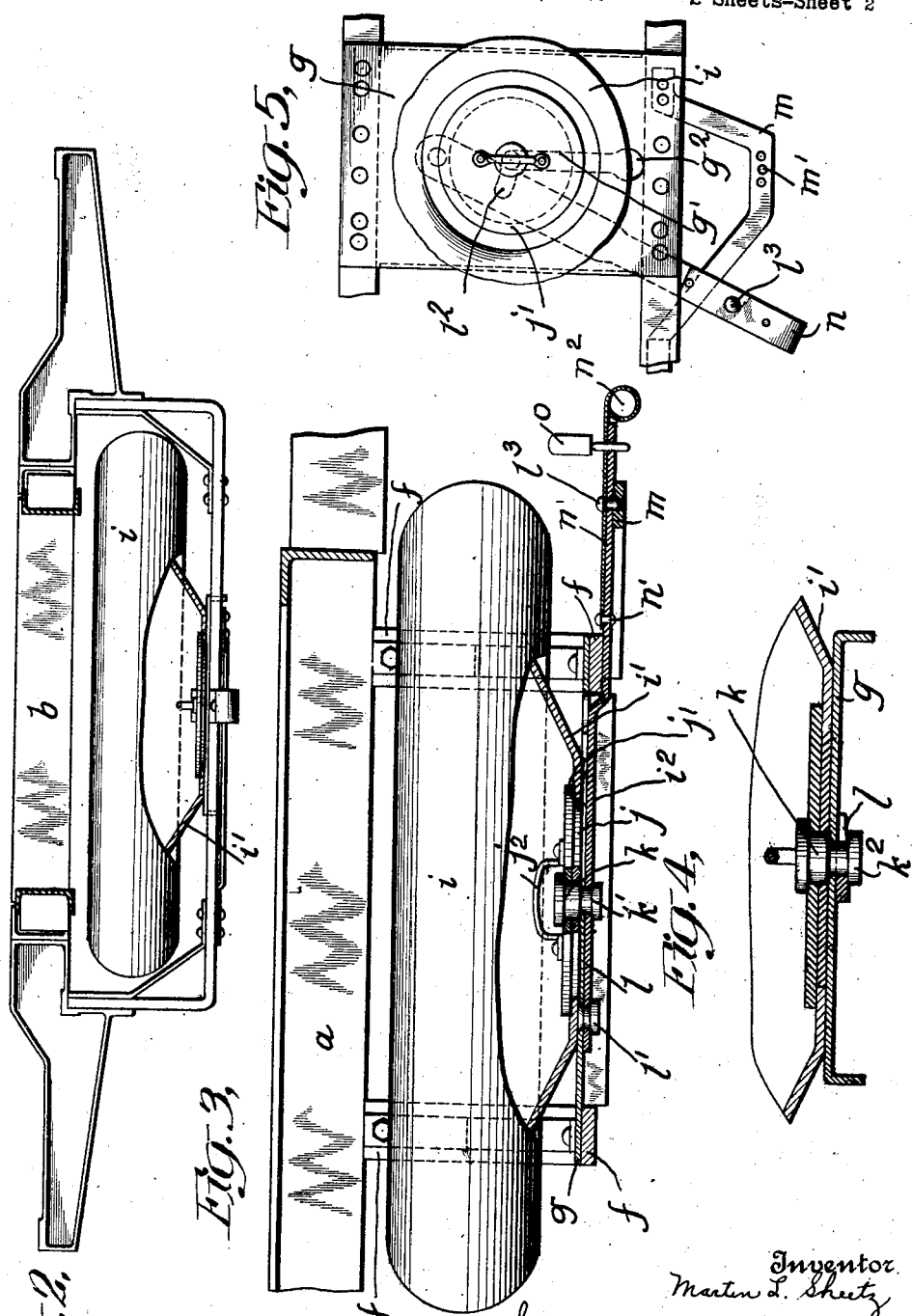
Inventor.
Martin L. Sheetz
By his Attorneys
Redding, Greeley, O'Shea & Campbell Patented Dec. 14, 1926.

1,610,722

UNITED STATES PATENT OFFICE.

MARTIN L. SHEETZ, OF ALLENTOWN, PENNSYLVANIA, ASSIGNOR TO INTERNATIONAL MOTOR COMPANY, OF NEW YORK, N. Y., A CORPORATION OF DELAWARE.

TIRE CARRIER.

Application filed February 2, 1926. Serial No. 85,434.

This invention relates to a tire carrier and has for its object to provide a carrier particularly adapted for use in connection with motor vehicles, such as motor buses, wherein the spare tire can be conveniently carried under the body, to be easily accessible but inconspicuous and out of the way. To this end a rack is provided, supported from the chassis frame and disposed adjacent the rear end of the body, and so constructed and arranged as to facilitate the positioning and removal of the spare tire. A further object of the invention has to do with the provision of a self-locating and non-rattling locking device whereby any size of tire, and the disc wheel on which it is carried, may be accomodated in the rack without adjustment and for the operation of which it is not necessary to get under the body. Accordingly the rack is formed with a longitudinally extending slot and devices are provided which extend through the slot to hold the tire in place, the slot facilitating the movement of the tire onto and off the rack and the tire holding devices locking the tire in position. More particularly, a clamping member is adapted to pass through the hub of the wheel and the slot for engagement by a wedge-shaped lever carried with the frame to clamp the tire in position. In order that the invention may be clearly understood and readily carried into effect the same will now be described more fully with reference to the accompanying drawings illustrating a preferred embodiment thereof and in which:

Figure 2 is a view in rear elevation taken in the plane indicated by the line 2—2 in Figure 1 and looking in the direction of the arrows, and showing the tire locked in position.

Figure 3 is a longitudinal vertical sectional view taken in the plane indicated by the line 3—3 in Figure 1 and looking in the direction of the arrows and showing in detail the devices for locking the tire and wheel in place.

Figure 4 is a fragmentary transverse, vertical sectional view taken in the plane indicated by the line 4—4 in Figure 1 and looking in the direction of the arrows and showing the shape of the lever in cross section.

Figure 5 is a plan view showing the manner in which the tire is unlocked for removal from the rack.

Figure 1:
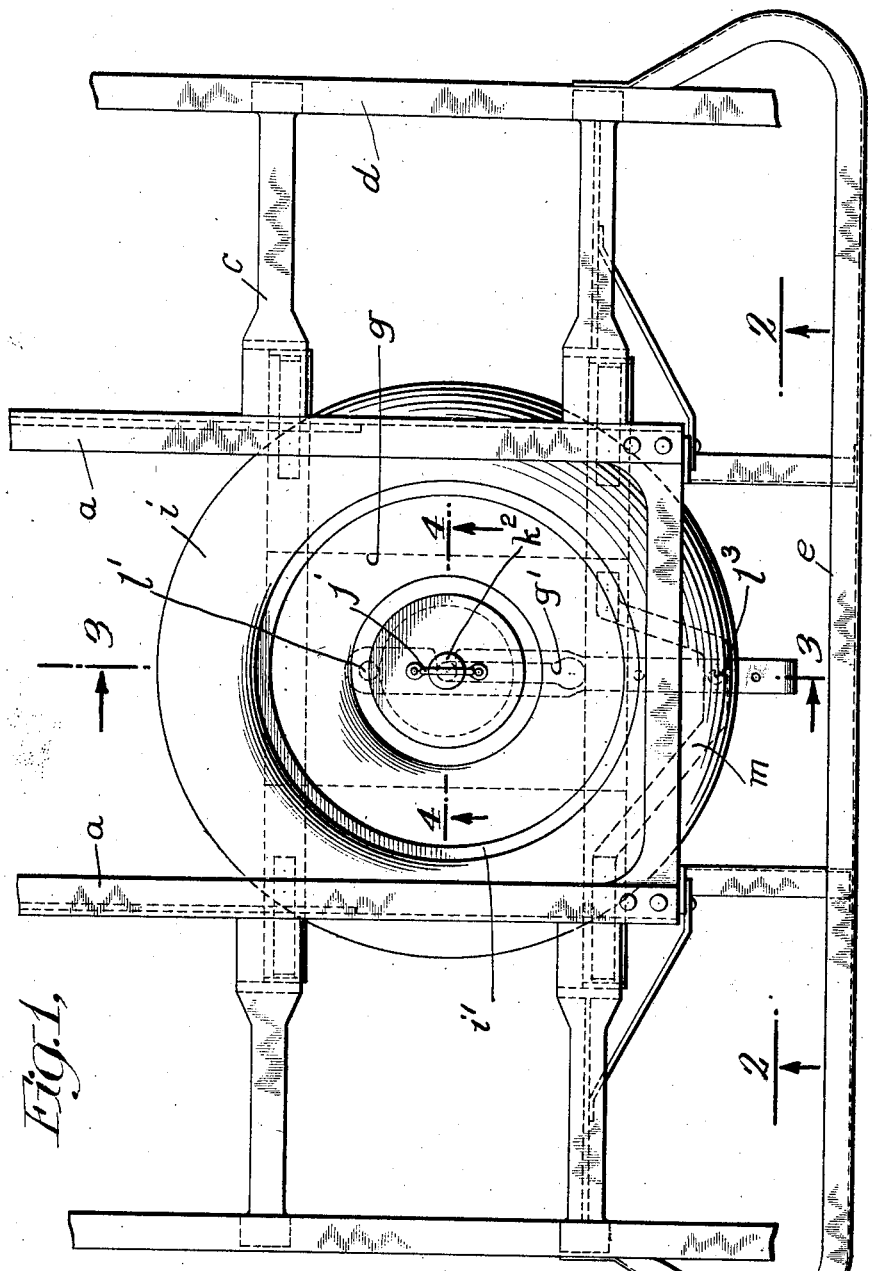
Figure 1 is a plan view showing a fragmentary portion of the chassis frame of a motor bus and the tire carrier therebeneath with a tire in position thereon.

Referring to the drawings, the chassis frame of the motor vehicle comprises generally the longitudinal side frame members $a$ braced at points by transverse members $b$ and the outriggers $c$ which are carried by the side frame members and whereof the ends are secured to longitudinal members $d$ supporting, with the outriggers, a running board, for instance, of the vehicle. A rear bumper is shown at $e$ extending between the side members $d$ in the plane thereof. The tire rack according to the present invention is supported beneath the rear end of the chassis structure just described, but inwardly of the bumper. It consists generally of a mounting plate $g$ upon which the tire is supported and which is suspended by U-shaped brackets $f$, $f$ from the outriggers. The mounting plate $g$ is formed with a keyhole slot $g'$ extending in a generally longitudinal direction with the portion $g^2$ of the slot of greatest diameter toward the rear adjacent the rear edge of the plate. The tire $i$, which is shown in the illustrated embodiment as carried upon a disc wheel $i'$ is adapted to be clamped to the mounting plate in the following manner: A tire carrier disc $j$ of a diameter just sufficient to lie within the aperture $i^2$ in the hub of the wheel disc and having an outwardly extending flange $j'$ to overlie the edges of the aperture has centrally disposed therebelow a clamp knob $k$ formed with an annular groove $k'$ adapted when in operative position, to extend within the key-hole slot $g'$ in the mounting plate and to extend partly below the mounting plate so that a portion of the groove may receive or be engaged by devices to clamp the wheel to the plate. The lowermost portion $k^2$ of the clamp knob $k$ is formed of a diameter just sufficient to enter the portion of larger diameter $g^2$ of the slot $g'$ while the annular groove $k'$ will permit the clamp knob to slide in the slot $g'$. When the clamp is placed on the tire carrier mounting plate and slid to the extreme inner position of the slot, that is, the normal carrying position of the tire, it will be found necessary to maintain the tire in that position against rattling or displacement. It is therefore clamped against the mounting plate by means of the lever $l$ which is pivotally connected as at $l'$ to the mounting plate $g$ immediately therebeneath. This lever extends outwardly beyond the frame in a rearwardly direction for a distance sufficient to afford a convenient grip for the hand and is adapted to travel over a locking frame $m$. Near the forward or inner end of the slot $g'$ the lever is formed with a notch $l^2$ of a width sufficient to receive the recessed portion $k'$ of the clamp knob. When the tire and wheel upon which it is mounted are being moved to carrying position the lever $l$ will occupy a position to the left as indicated in Figure 5 but to lock the tire in position the receiver is moved to the right as viewed in Figure 1 at which time the notch $l^2$ engages the clamp knob as shown in Figures 1 and 4. The edges of the clamping lever are preferably tapered (Figure 4) to give a cam or wedging action whereby the disc $j$ is pulled down firmly toward the mounting plate to clamp the tire disc in carrying position. To rigidly maintain the locking lever $l$ in operative position the frame $m$ is provided with a series of holes $m'$ and the lever is provided with a pin $l^3$ adapted to engage in one of the holes $m'$ dependent upon the wear of the parts as will be understood. If desired, the tire carrier disc $j$ may be formed with handle $j^2$ for convenience in handling. Preferably the clamp knob will be formed separately of the tire carrier disc but may be permanently retained in operative relation therewith.

To prevent the displacement of the pin $l^3$ and thus the releasing of the locking lever when it is not desired so to do, means are provided for yieldingly retaining the pin in position. To this end a spring plate $n$ is carried with the lever $l$ and this spring plate carries the pin $l^3$. Spring $n$ is rigidly clamped to the lever as at $n'$ and may be formed outwardly beyond the end of the lever with a hand grip $n^2$. Due to the resiliency of the spring plate the pin $l^3$ will have a constant tendency to be forced downwardly through the aperture in the lever and into one of the holes $n'$. In order to move the lever to unlocking position, it is merely necessary to grasp the hand hold of the spring plate and lift the same to raise the pin $l^3$ out of a hole $n'$ whereupon the lever is free for movement. In order to prevent the unauthorized removal of the pin to free the tire, locking devices, such as the padlock $o$ may pass through holes in the spring plate and lever.

It will thus be seen that a tire carrier has been provided which can accommodate tires of various sizes and the wheel discs upon which the tires are mounted in such manner that they are out of the way but are readily accessible for instant removal when occasion demands.

Various modifications may be made in the construction of the tire rack as well as in the form taken by the clamping devices and locking means therefor and no limitation is intended by the foregoing description except as indicated in the appended claims.

What I claim is:

1. In a tire carrier, the combination with a wheel disc and tire carried thereon, of a plate formed with a slot, a retaining disc for co-operation with wheel disc, a knob carried with the retaining disc and formed with an annular groove and adapted to extend within the slot, and a lever pivoted beneath the plate and formed with a notch to engage the groove in the knob.

2. In a tire carrier, the combination with a wheel disc and tire carried thereon, of a plate formed with a slot, a retaining disc for co-operation with the wheel disc, a knob carried with the retaining disc and formed with an annular groove and adapted to extend within the slot, a lever pivoted beneath the plate and formed with a notch to engage the groove in the knob, and means to retain the lever in operative position.

3. In a tire carrier, the combination with a wheel disc and tire carried thereon, of a plate formed with a slot, a retaining disc for co-operation with wheel disc, a knob carried with the retaining disc and formed with an annular groove and adapted to extend within the slot, a lever pivoted beneath the plate and formed with a notch to engage the groove in the knob, and means to retain the lever in operative position comprising a pin.

4. In a tire carrier, the combination with a wheel disc and tire carried thereon, of a plate formed with a slot, a retaining disc for co-operation with the wheel disc, a knob carried with the retaining disc and formed with an annular groove and adapted to extend within the slot, a lever pivoted beneath the plate and formed with a notch to engage the groove, a bracket carried with the frame and formed with an aperture, and means to retain the lever in locking position comprising a pin adapted to engage the aperture in the bracket.

5. In a tire carrier, the combination with a wheel disc and tire carried thereon, of a plate formed with a slot, a retaining disc for co-operation with wheel disc, a knob carried with the retaining disc and formed with an annular groove and adapted to extend within the slot, a lever pivoted beneath the plate and formed with a notch to engage the groove, a bracket carried with the frame and formed with an aperture, means to retain the lever in locking position comprising a pin adapted to engage the aperture in the bracket, and means to prevent displacement of the pin.

This specification signed this 18th day of January, A. D. 1926.

MARTIN L. SHEETZ.